United States Patent [19]

Lederman

[11] Patent Number: 4,828,086
[45] Date of Patent: May 9, 1989

[54] REDUCED WEAR ROLLER CLUTCH

[75] Inventor: Frederick E. Lederman, Sandusky, Ohio

[73] Assignee: General Motors Corporation, Detroit, Mich.

[21] Appl. No.: 240,684

[22] Filed: Sep. 6, 1988

Related U.S. Application Data

[63] Continuation-in-part of Ser. No. 123,816, Nov. 23, 1987, abandoned.

[51] Int. Cl.⁴ ............................................. F16D 41/06
[52] U.S. Cl. .................................... 192/45; 192/41 R
[58] Field of Search ....................... 192/41 R, 44, 45; 188/82.84

[56] References Cited

U.S. PATENT DOCUMENTS

| | | | |
|---|---|---|---|
| 2,044,197 | 6/1936 | Barthel | 192/45 |
| 2,532,670 | 12/1950 | La Brie | 192/45 |
| 3,732,956 | 5/1973 | Johnson et al. | 192/45 |
| 4,549,638 | 10/1985 | Johnston | 192/45 |

Primary Examiner—Rodney H. Bonck
Assistant Examiner—David A. Testardi
Attorney, Agent, or Firm—Patrick M. Griffin

[57] ABSTRACT

A roller clutch includes control blocks which, during overrun, rub on the pathway, and are thereby forced into the rollers to counterbalance the energizing spring force and thereby reduce the wear that spinning rollers would otherwise cause on the cam ramps.

3 Claims, 2 Drawing Sheets

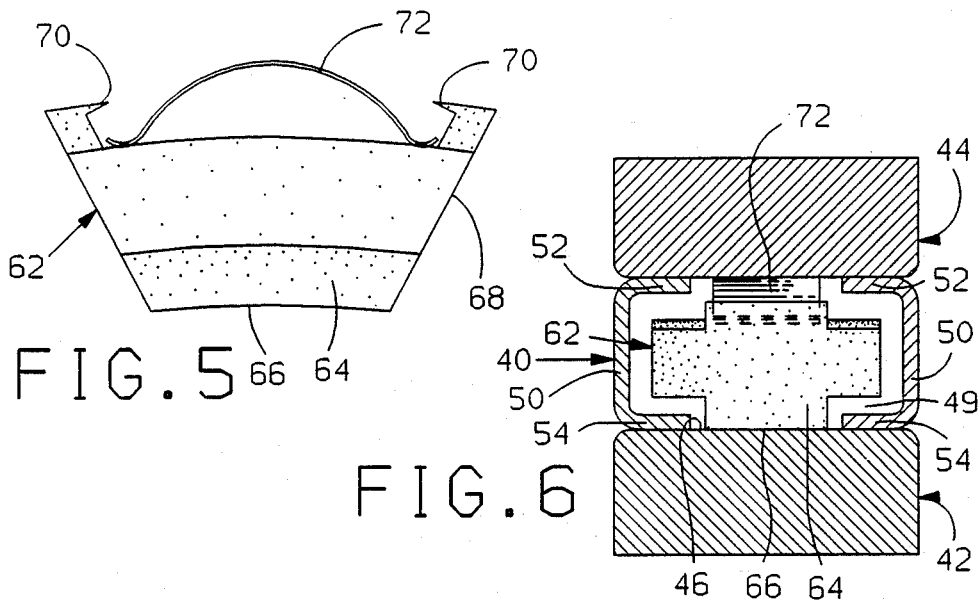
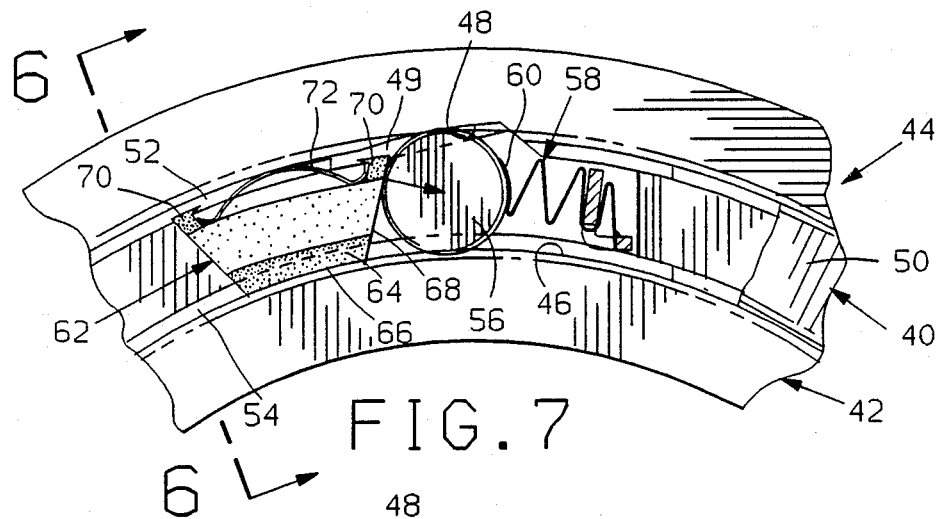
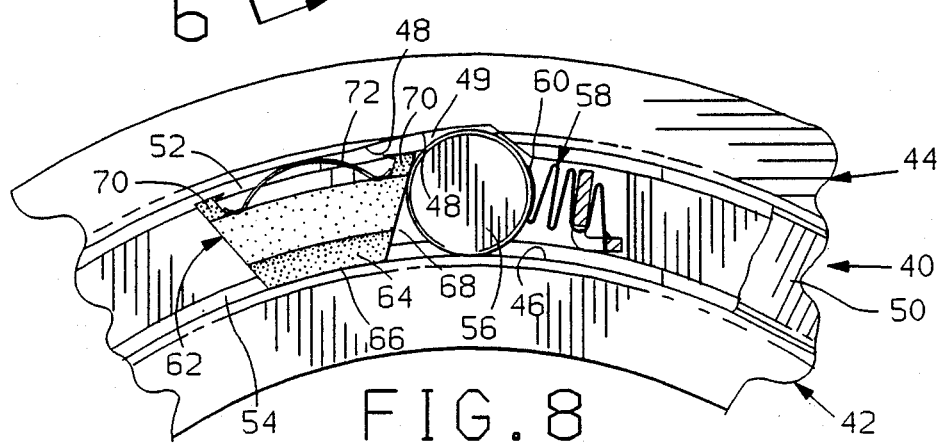

REDUCED WEAR ROLLER CLUTCH

This application is a continuation-in-part of Ser. No. 123,816 filed Nov. 23, 1987 now abandoned.

BACKGROUND OF THE INVENTION

The two most common choices for overrunning clutches in high speed environments, such as the gear sets of automatic transmissions, are those with sliding wedging elements, generally referred to as sprags, and those with rolling wedging elements, usually cylindrical rollers. In sprag clutches, the wedging elements are typically dumbbell shaped with sloped end surfaces that jam between two confronting cylindrical race surfaces to lock up in one relative direction, while allowing overrun in the other. Since they do not spin, the sprags are not especially speed sensitive. However, sprags are not as strong as cylindrical rollers, so a large number of them must be used, and they are expensive to manufacture, creating a large cost penalty relative to roller clutches. The rollers in a roller clutch are located in wedging pockets that are formed by a cylindrical surface on one race, usually called the pathway, which confronts a series of sloped cam ramps formed on the other race, usually called the cam race. The rollers are spring urged toward the narrow end of the pocket to a ready position, that is, a position in which they are in continual contact with both the pathway and their respective cam ramps. From ready position, the rollers can quickly jam between and lock the races together if they attempt to change their direction of relative rotation. The drawback of roller clutches is that they are speed sensitive, a problem which manifests itself in two different ways, depending on whether the clutch has an outer or an inner cam race.

In the case of an outer cam roller clutch in which the outer cam race also sees high absolute rotational speeds, centrifugal force can throw the rollers out, away from the pathway and away from ready position. The force of the outwardly thrown rollers can actually overcome the force of the energizing springs that are supposed to keep them in ready position at the narrow end of the wedging pockets, a problem referred to as roller drift. A known solution is shown in the U.S. Pat. No. 4,549,638 to Johnston, assigned to the assignee of the present invention. At least some of the energizing springs are mounted to tracked weights which, at high speeds, slide opposite to the direction of roller drift and compress the springs more, thereby pushing harder on the rollers to keep them in ready position. If the outer cam race turns slowly, so that there is no significant roller drift counteracting the energizing spring, the energizing spring force alone can cause roller-pathway traction, and consequent roller spin and wear on the cam ramps. Roller spin is often a worse problem in the case of inner cam clutches, however, as is explained more fully next.

In an inner cam clutch where the inner cam race sees high absolute speeds during overrun, the rollers are thrown outwardly, but are thereby moved more strongly into the pathway, rather than away from it. The traction of the pathway on the rollers can therefore cause them to spin, often very rapidly. Two different mechanisms may bring the rapidly spinning rollers into contact with the cam ramps. If the rollers are stable at overrun, then their own energizing springs keep them continually in contact with the cam ramps, at the ready position. If the rollers are unstable during overrun, twisting, skewing and moving back and forth intermittently in their wedging pockets, they may be forced into the cam ramps even more strongly. In either event, the spinning rollers have the potential to dig into and locally wear the cam ramps, which can disrupt the cam ramp strut angle. In the case where the inner cam race does not see high absolute speeds, centrifugal force would not contribute appreciably to pathway traction on the rollers. However, the force with which the energizing springs keep the rollers in continual contact with the rapidly relatively moving pathway can still lead to rapid roller spin and wear.

The prior art recognizes the roller spin and wear problem during overrun, in at least one instance. But the solution proposed there may not work well when it is most needed, and may not be needed when it would work well. U.S. Pat. No. 2,044,197 to Barthel proposes biasing the rollers to ready position indirectly, through weighted blocks that are pivoted to the cam race in such a way as to pivot away from the rollers, and reduce the spring pressure, when the cam race is rotating at high speed. In its FIG. 1 embodiment, where the inner race is the cam race and is rotating at high absolute speeds, the spring pressure would in fact be reduced, but centrifugal force would still throw the rollers radially outwardly and into the pathway, causing pathway traction and roller spin. Although the springs would no longer be forcing the spinning rollers into the cam ramps, unstable rollers could still hit the cam ramps, as noted above, and cause wear. In Barthel's FIG. 3 embodiment, where the outer race is the cam race and is rotating at high absolute speeds, the spring pressure would again be reduced, but centrifugal roller drift would already be acting to reduce the spring pressure, anyway. And, in either embodiment, if the cam race were not moving at high absolute speed, there would be no effect on spring pressure at all. Furthermore, the large pivoted weights take up so much room between the races that the energizing springs may be consequently too small to be practical.

SUMMARY OF THE INVENTION

The roller clutch of the invention provides a means for reducing roller wear at high overrun speeds that is practical and workable, no matter which race is moving at high absolute speed. The first embodiment disclosed is in an inner cam clutch. The cam ramps of the cam race all slope upwardly in one circumferential direction, that is, toward the narrow end of the wedging pockets. Roller conforming end loops of conventional energizing springs acting on one side of the rollers continually urge the rollers toward a ready position at the narrow end of the wedging pockets. The size and configuration of the cage, rollers, and springs are all conventional, and they fit within the existing annular space between the races with no modification. The second embodiment is an outer cam clutch, and the cam ramps all slope downwardly in one circumferential direction, again, toward the narrow end of the wedging pockets.

In the first embodiment, a control block is located on the opposite side of each roller from its energizing spring, and is loosely retained within the side rails of a cage that is installed to the cam race. Molded of nylon or other suitable material, each control block has a generally planar end surface that is engageable with a respective roller and an arcuate outer surface that confronts the pathway. Although not particularly heavy, each control block has sufficient weight such that, at high overrun speeds, it will be thrown outwardly into the pathway, where it will rub. The frictional force of the relatively moving pathway on the control blocks will tend to move them toward the wide end of the wedging pockets. The control blocks will move toward the wide end of the wedging pockets until they contact their respective rollers. At that point, the frictional force induced on the control blocks by the relatively moving pathway will also tend to move the rollers toward the wide end of the wedging pockets, against the force of the energizing springs. So long as the control block force is substantially equal to the energizing spring force, the force with which the energizing springs push the rollers into either the pathway or cam ramps, or both, will be reduced, regardless of whether the rollers are actually physically moved toward the wide end of the wedging pockets. Thus, the spin speed of the rollers, or the force with which the spinning rollers are pushed into the cam ramps, or both, will be reduced.

In the second embodiment, a control block of similar shape and material is also located on the opposite side of each roller from its energizing spring. In the second embodiment, however, a compression spring urges the control block continually inwardly, so that an arcuate lower surface of the control block is continually biased into the inner pathway. There is no relative motion between the races during lockup, so the block is inoperative, and causes no drag. But, during overrun, the control block spring provides the actuation force that centrifugal force provides in the first embodiment. As with the first embodiment, the rubbing of the inner surface of each control block on the relatively moving pathway similarly forces each block in the opposite circumferential direction, toward the wide end of the wedging pocket, and toward and eventually into its respective roller. The same effect on the roller is achieved.

For each embodiment, clutch operation is improved in several ways. First, during overrun, the the control blocks, by pushing on the rollers in opposition to the energizing springs, reduce the wear of the rollers against the cam ramps. As the races change relative direction at the transition from overrun to lock up, the frictional force on the control blocks stops. Therefore, the energizing springs can again act without opposition to keep the rollers at ready position, so the smooth transition from overrun to lockup is not jeopardized. In addition, during overrun, the rollers are captured and confined between the ends of the energizing springs and the ends of the control blocks. This lessens the skew and unstable oscillation to which the rollers would otherwise be subject, which is another factor in causing wear. The reduced wear and improved operation are obtained therefore, with no change in the basic size, configuration or lock up ability of the clutch, and with little change in its weight or cost.

It is, therefore, a broad object of the invention to reduce roller wear, and improve overrun performance, in a roller clutch.

It is yet another object of the invention to reduce wear through the use of control blocks that frictionally engage the pathway during overrun, thereby tending to force the rollers toward the wide end of the wedging pockets in opposition to the energizing springs.

It is yet another object of the invention to confine the rollers between the control blocks and the energizing springs during overrun so as to reduce roller skew and improve roller stability.

DESCRIPTION OF THE PREFERRED EMBODIMENT

These and other objects and features of the invention will appear from the following written description, and from the drawings, in which:

FIG. 5 is a is a side view of the control block used in a second preferred embodiment of the invention;

FIG. 6 is a cross section taken along the line 6-6 of FIG. 7.

FIG. 7 is a view like FIG. 1, but shows the second embodiment in lock up;

FIG. 8 is a view like FIG. 8, but shows overrun.

Figure 1:
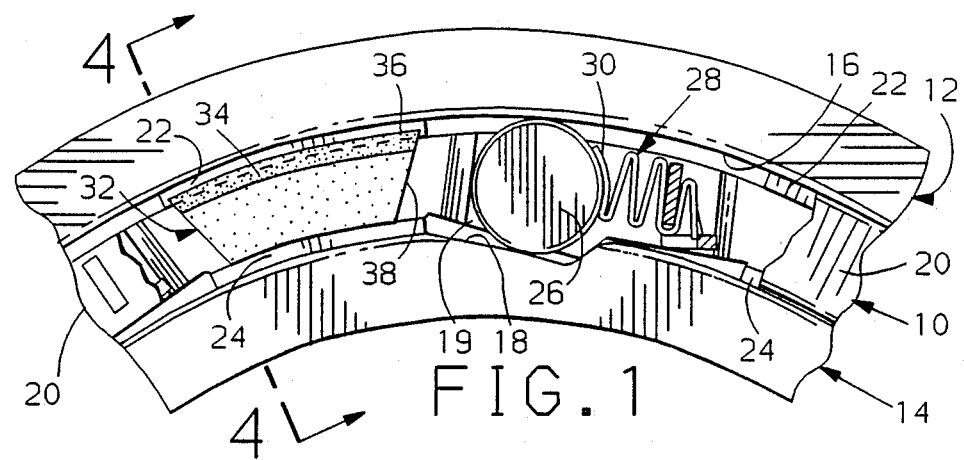
FIG. 1 is an end view of a portion of two races and a first preferred embodiment of the clutch in lock up.

Referring first to FIG. 1, a preferred embodiment of the roller clutch of the invention, designated generally at 10, is shown installed between an outer pathway race, designated generally at 12, and an inner cam race, designated generally at 14. As is conventional, the pathway race 12 has a cylindrical inner surface 16, usually referred to as just the pathway, while cam race 14 has an evenly circumferentially spaced series of cam ramps 18 formed thereon. Here, the cam ramps 18 slope upwardly in the counterclockwise direction as they confront the pathway 16, forming a plurality of wedging pockets 19, each having a wide and a narrow end. Clutch 10's basic structural framework is provided by a cage including a pair of rigidly spaced metal side rails 20. The side rails 20 are non turnably held to the cam ramps 18 at their inner edges when they are installed to the cam race 14, and have inwardly bent flanges 22 at their outer edges, and 24 at their inner edges. The lower flanges 24 rest on the cam race 14, while the upper flanges 22 ride on the pathway 16, providing bearing surfaces to keep races 12 and 14 substantially coaxial to one another during overrun. A plurality of wedging elements, cylindrical rollers 26 in this case, are retained between the side rails 20, which locate one roller 26 in each respective wedging pocket 19.

Still referring to FIG. 1, each roller 26 is urged continually counterclockwise, that is, toward the narrow end of its respective wedging pocket 19, by a cage mounted energizing spring, designated generally at 28. Each spring 28 has a roller conforming end loop 30 that partially wraps roller 26 and bears on the side thereof that faces the wide end of its respective energizing pocket 19. FIG. 1 represents the lock up mode. That is, the forces on the races 12 and 14 are such as to tend to rotate cam race 14 clockwise relative to the pathway race 12, or opposite to the direction of the slope of cam ramps 18. An equivalent situation is when the forces are such as to tend to rotate the pathway race 12 counterclockwise relative to cam race 14. Since the energizing springs 28 continually bias the rollers 26 toward the narrow end of the wedging pockets 19, they keep the rollers 26 at a ready position where they are continually in contact with both the pathway 16 and the cam ramps 18. When forces tend to relatively rotate the races 12 and 14 as just described, the rollers 26 will jam in the wedging pockets 19, locking the races 12 and 14 together so that they turn at the same speed relative to one another, regardless of whether that speed is fast or slow in the absolute sense. In fact, FIG. 1 represents a case where the races 12 and 14 are either stationary or very slow in terms of absolute speed. Of course, during lockup, the rollers 26 do not move relative to, or wear on, either race 12 or 14. The structure of clutch 10 described so far is conventional, both as to size and general configuration, and if clutch 10 in fact included nothing else, it would operate conventionally.

Still referring to FIG. 1, if the relative forces on races 12 and 14 were to reverse, such that cam race 14 now tended to rotate relative to pathway race 12 in the same direction as the slope of the cam ramps 18, counterclockwise, the races 12 and 14 would unlock and cam race 14 could freely overrun in that relative direction. This would hold true regardless of whether the absolute rotational speed of cam race 14 was stationary, slow in either direction, or fast in either direction, so long as the relative directions of races 12 and 14 were as just described. In fact, the condition in overrun that generally exists in the particular transmission gear set for which the invention is intended is that the absolute rotational speed of cam race 14 is very rapid in the counterclockwise direction, while the absolute speed of pathway race 12 is stationary. Relative to the cam race 14, however, pathway race 12 is turning very rapidly clockwise. As a consequence, without the improvement of the invention, the rollers 26 would be thrown strongly radially outwardly by the centrifugal force of the rapidly rotating cam race 14 and into strong contact with pathway 16. The consequent traction of the pathway 16 against the rollers 26 would spin them clockwise. If the spinning rollers 26 were maintained stable at ready position by the energizing springs 28, then they could rub and wear continually on their respective cam ramps 18, potentially disturbing the proper strut angle of the ramps 18. And if the rollers 26 were not stable during overrun, but instead moved back and forth and skewed intermittently in the wedging pockets 19, they could still hit and wear on the cam ramps 18. Of course, roller instability alone is a potential problem, as it threatens quick and efficient lockup. In other environments, the inner cam race 14 may not be turning rapidly in the absolute sense, so there would be little or no centrifugal force on rollers 26, or on any other structure carried by cam race 14. Even then, however, since the relative speed of pathway race 12 to the cam race 14 is high, the pathway traction caused on roller 26 by the force of spring 28 alone could cause significant roller spin and wear. The invention deals with both roller spin and instability.

Figure 4:
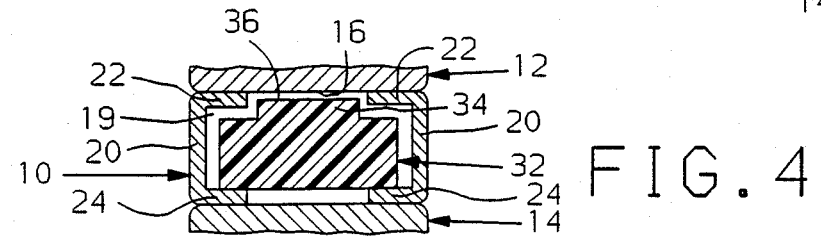
FIG. 4 is a cross section taken along the line 4—4 of FIG. 1.

Referring next to FIGS. 1 and 4, clutch 10 also includes a plurality of control blocks, one of which is illustrated fully and indicated generally at 32. Each control block 32 has the general shape of an annular section, with a reduced width upper section 34 having an arcuate outer surface 36 and a planar end surface 38 that faces a respective roller 26. In the embodiment disclosed, the control block end surface 38, while flat, is also sloped toward the cam ramp 18, and away from the pathway 16. Each block 32 is located on the side of a respective roller 26 opposite its spring 28. While the blocks 32 are fairly loosely contained between the side rails 20, and can therefore move back and forth both circumferentially and radially, they are radially confined between the flanges 22 and 24 and axially confined between the side rails 20, and thereby retained to clutch 10. As best seen in FIG. 4, each block upper section 34 is also fairly closely confined between the upper flanges 22, giving it a significant measure of guidance as it moves circumferentially. In the embodiment disclosed, the blocks 32 are molded of nylon, which has good wear resistance relative to steel, and which has been used successfully for journal blocks in concentric control cages. As a consequence, the blocks 32 are very light and one would naturally expect them to be incapable of doing much to affect the operation of the much heavier rollers 26, at least applying known methods of centrifugal action as taught in the prior art. The invention, however, uses the very mechanism that causes the roller spin problem in the first place, that is, the rapid relative rotation of the pathway 16 during overrun, to solve the problem.

Figure 2:
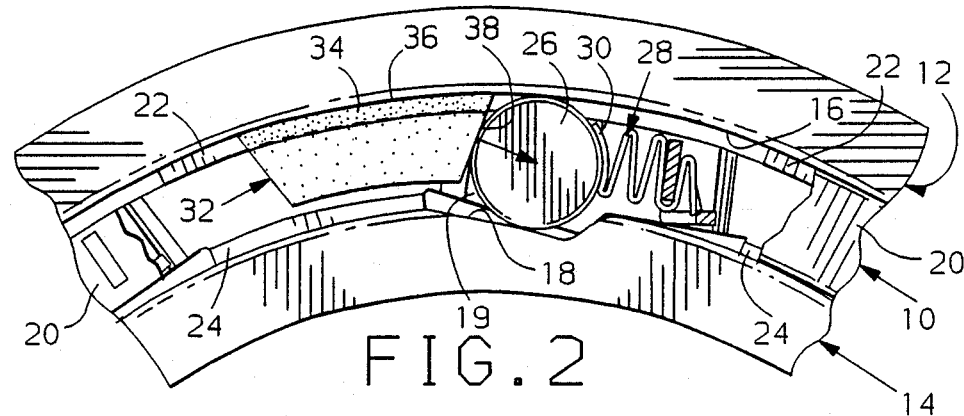
FIG. 2 is like FIG. 1, but shows the transition between lock up and overrun.
Figure 3:
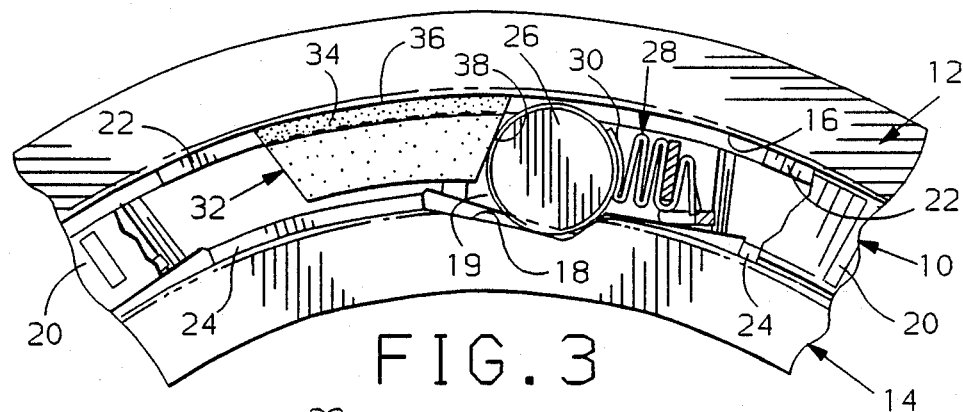
FIG. 3 is like 1 and 2, but shows overrun.

Referring next to FIGS. 2 and 3, when the forces on the races 12 and 14 tend to reverse their relative direction, lockup ends. Here, as noted above, the condition existing at overrun is a very rapid rotation of cam race 14 counterclockwise and a stationary pathway race 12. Relative to the cam race 14 and rollers 26, therefore, pathway 16 will be rotating very rapidly clockwise. Although they are very light, there is sufficient centrifugal force, especially at high speeds of the cam race 14, to throw the control blocks 32 outwardly and engage their outer arcuate surfaces 36 with the pathway 16. There is, then, a frictional force induced on blocks 32 by contact with pathway 16 that tends to move them clockwise relative to cam race 14, toward the wide end of the wedging pockets 19. Since the blocks 32 start out spaced away from the rollers 26, the frictional force does in fact physically move them clockwise, until each block control end surface 38 contacts a roller 26 along essentially its entire roller length, as seen in FIG. 2. If each block end surface 38 started out already in contact with a respective roller 26, it would not have have to move before contacting it, of course. Although the centrifugal force experienced by the light blocks 32 is small, the frictional force induced on them by pathway 16, which is a function of the relative speed of pathway 16, is sufficiently strong to at least tend to also move the rollers 26 toward the wide end of the wedging pocket 19, in opposition to the energizing springs 28. So long as the opposing force of the control blocks 32 on the rollers 26 is substantially equal to the force of the energizing springs 28, then the degree to which the energizing springs 28 force the rollers 26 into the cam ramps 18 and the pathway 16 will be reduced. Consequently, both the speed of spin that the traction of pathway 16 creates on the rollers 26, and the degree to which the rollers 26 will dig into the cam ramps 18, whatever their spin speed, will be reduced. Both factors act to reduce the potential wear of rollers 26 on the cam ramps 18.

Still referring to FIGS. 2 and 3, it should be understood that the force of the control blocks 32 need not be strong enough to perceptively, physically move the rollers 26 toward the wide end of the wedging pockets, so long as it tends to move the rollers 26 that way. If the force of the control blocks 32 were strong enough to shift the rollers into the wide end of the wedging pockets 19, then the rollers could no longer contact both the cam ramps 18 and the pathway 16 at once. Thus, if any given roller 26 was being spun by the pathway 16, it could not be touching its respective cam ramp 18, and, if it were touching its respective cam ramp 18, it couldn't be touching, or being spun by, the pathway 16. Either way, wear on the cam ramps 18 would be essentially eliminated. In the specific case shown, the force of the control blocks 32 is in fact sufficiently strong to overcome the energizing springs 28 and move the rollers 26 toward the wide end of the wedging pockets 19. Furthermore, since each control block end surface 38 is sloped toward the cam ramp 18 and away from the pathway 16, it will move its respective roller 26 down the cam ramp and out of engagement with the pathway 16. This is illustrated in FIG. 3, although the amount of disengagement shown is exaggerated for purposes of clear illustration. The vector along which the force of the control block 32 would act is a line normal both to the axis of roller 26 and to the contact line of the control block end surface 38 with roller 26, and is shown by an arrow. It will be noted that the vector points away from the pathway 16. Should the relative speed between the races 12 and 14 be less, then block 32 would experience less frictional force, but the blocks 32, acting is opposition to the sprigs 28, would still reduce the contact force between rollers 26 and pathway 16.

Another benefit of the invention is that the stability of rollers 26 is improved during overrun, in addition to the wear reduction. During overrun, the rollers 26 are trapped and confined between the block sloped end surfaces 38 and the roller conforming spring end loops 30. Since the block upper sections 34 are fairly closely confined between the side rail upper flanges 22, the blocks 32 are guided and limited by the side rails 20 as they move, and the block end surfaces 38 will be kept substantially parallel to the coaxis of races 12 and 14. This guidance of blocks 32, together with the capturing of rollers 26 in a force equilibrium between the block end surfaces 38 and the roller conforming spring end loops 30, reduces potential roller skew and oscillation. Although the degree of disengagement of rollers 26 from pathway 16 is exaggerated in FIG. 3, any amount could be considered to be an interference with the proper ready position of rollers 26. However, it should be kept in mind that, during the transition from overrun to lock up conditions, regardless of whether that transition occurs quickly or slowly, the condition that induces the spring 28 opposing friction force on the the blocks 32 in the first instance, that is, the clockwise rotating of pathway 16 relative to cam race 14, will cease. Therefore, the counteracting force on springs 28 will end, and the springs 28 have a chance to move the rollers 26 back to ready position so as not to jeopardize a smooth transition to lock up. Of course, in other circumstances, the rollers 26 would not even have been moved away from ready position during overrun.

As noted above, roller spin could still occur in a case where the absolute rotational speed of cam race 14 was slow, or even stationary. However, there would then be no significant centrifugal force induced by the cam race 14 on the control blocks 32. so, some other means would have to used to activate the control blocks 32. The hallmark of the invention is the use of pathway friction, not centrifugal force per se, as the means to oppose the force of the springs 28 during overrun and reduce roller spin. With an understanding of the basic mechanism of the invention, variations of the embodiment 10 disclosed may be seen that would work under conditions where centrifugal force was not available to cause pathway 16 to rub on the control blocks 32. For example, a light spring compressed between inner race 14 and the undersurface of block 32 could be used to continually bias the block outer surface 36 into pathway 16. This would do nothing during lockup, when there is no relative race rotation, but would induce the same frictional force on block 32 during overrun. The control block 32 could be inherently resilient and bent in to a U shape so as to engage pathway 16 continually under its own resilience. The basic operation would be the same as the embodiment disclosed.

Referring next to Figures to FIGS. 7 and 8, a second embodiment of the invention is designated generally at 40, which helps to illustrate the broadest concept of the invention. Clutch 40 is installed between an inner pathway race, designated generally at 42, and an outer cam race, designated generally at 44. Therefore, centrifugal force cannot be used to push anything inwardly into the pathway race 42. Still, the second embodiment of the invention works in essentially the same manner, and may be described much more briefly. Pathway race 42 has a pathway 46 that confronts the cam ramps 48 to create wedging pockets 49. Metal cage side rails 50, which also include inwardly bent upper flanges 52 and lower flanges 54, also fit non turnably onto the cam ramps 48 when they are installed to the cam race 44. Cylindrical rollers 56 are retained between the side rails 50, one located in each respective wedging pocket 49, and each is urged continually toward the narrow end of its respective wedging pocket 49 by an energizing spring 58. Each spring 58 has a roller conforming end loop 60. It should be understood that the second embodiment 40 is primarily intended for situations where, at overrun, the outer cam race 44 is stationary or slow, while the inner, pathway race is rotating rapidly clockwise. If the outer cam race 44 had significant absolute rotational speed counterclockwise at overrun, then roller drift would reduce the spin problem anyway, and the invention would not be as necessary or useful.

Referring next to FIGS. 5 and 6, the control block in the second embodiment 40, designated generally at 62, is of the same material and general shape as block 32. Given the reversal of races, however, control block 62 has a lower section 64 that has an arcuate lower surface 66 conforming to the inner pathway 46. The end surface 68 of block 62 is also flat, but is sloped oppositely to block end surface 38 above, that is, it is sloped away from cam ramp 48 and toward the pathway 46. As best seen in FIG. 5, a pair of molded inturned fingers 70 are molded to the upper surface of block 62. Fingers 70 capture the ends of a curved metal spring 72, shown in FIG. 5 in its free state. Each block 62 and attached spring 72 is located in the equivalent position to block 32, that is, on the side of a respective roller 56 opposite to the spring 58, as best seen in FIG. 6. Spring 72 is compressed down from its free state when clutch 40 is installed, thereby continually biasing the arcuate lower block surface 66 into the pathway 46. The spring 72 is confined between the side rail upper flanges 52, while the block's lower section 64 is confined between the side rail lower flanges 54. Thus, each block 62 can also move circumferentially toward and away from the wide end of its respective wedging pocket 49, guided by the side rails 50.

Referring again to FIGS. 7 and 8, the second embodiment 40 operates as follows. During lock up, FIG. 7, there is no effect on block 62, as there is no relative motion between the races 42 and 44. During overrun, FIG. 8, the frictional force of relatively moving pathway 46 on the inwardly biased block lower surface 66 moves block 62 toward the wide end of its wedging pocket 49 and into its respective roller 56. Because of the slope of block end surface 68, the roller 56 is moved down, away from contact with the cam ramp 48. While roller 56 could still be spun by contact with the pathway 46, the spin would do nothing to wear on the cam ramp 48. At the transition from overrun back to lockup, the frictional force on blocks 62 would lessen and then stop, as with blocks 32, and their opposing force on the energizing springs 58 would end. Having seen two embodiments of the same basic idea of using pathway friction during overrun to push on a control block to counterbalance the energizing spring force and thereby reduce the cam ramp wear caused by roller spin, it will be understood that other embodiments of the broad invention are possible, and the claims are not intended to be limited to just the two embodiments disclosed.

The physical embodiments of the invention in which an exclusive property or privilege is claimed are defined as follows:

1. In an overrunning clutch of the type that is adapted to be installed to a cam race having a plurality of cam ramps thereon sloping in one circumferential direction, each of which confronts a cylindrical pathway of a substantially coaxial pathway race to form a series of wedging pockets, each having a wide end and a narrow end, and in which a roller is located in each wedging pocket, and in which each roller is continually energized on one side by a spring toward the narrow end of said wedging pocket so as to to be ready to quickly wedge between said cam ramps and said pathway to lock said races together when said cam race tends to rotate relative to said pathway race in the opposite circumferential direction, while said cam race may freely overrun relative to said pathway race in said one circumferential direction, and in which the traction of said pathway on said rollers during overrun tends to spin said rollers and thereby wear said cam ramps when said rollers engage said cam ramps, the improvement comprising, a plurality of control blocks, each of which is located between said races on the opposite side of a respective roller from said roller's energizing spring and each of which is circumferentially movable toward the wide end of said wedging pocket, each of said control blocks also having a surface that is engageable with said pathway, and, means engaging said control block surfaces with said pathway during overrun so as to induce a frictional force on said control blocks that tends move said control blocks toward the wide end of said wedging pockets, whereby, when said cam race overruns relative to said pathway in said one circumferential direction, said control blocks will tend to be moved toward the wide end of their respective wedging pockets by the frictional force induced on them by said pathway and will consequently tend to move their respective rollers toward the wide end of said wedging pockets, against the force of their energizing springs, thereby reducing the wear of said rollers against their respective cam ramps, with the frictional force of said pathway on said control blocks ending as said cam race reverses its relative direction, thereby allowing the energizing springs to again act on said rollers without opposition from the control blocks.

2. An overrunning clutch of the type that is adapted to be located between a cam race having a plurality of cam ramps thereon sloping in one circumferential direction and a cylindrical pathway of a substantially coaxial pathway race, with each of said cam ramps confronting said pathway to form a series of wedging pockets, each having a wide end and a narrow end, said clutch comprising, a cage adapted to be installed to said cam race, a plurality of rollers retained by said cage, each of which is located in a respective wedging pocket, a plurality of energizing springs, each of which continually biases a respective roller on one side toward the narrow end of a respective wedging pocket and into contact said pathway and its respective cam ramp so as to be ready to quickly wedge between said races to lock said races together when said cam race tends to rotate relative to said pathway race in the opposite circumferential direction, while said cam race may freely overrun relative to said pathway race in said one circumferential direction, a plurality of control blocks, each of which is located between said races on the opposite side of a respective roller from said roller's energizing spring and each of which is circumferentially movable toward the wide end of said wedging pocket, each of said control blocks also having a surface that is engageable with said pathway, and, means engaging said control block surfaces with said pathway during overrun so as to induce a frictional force on said control blocks that tends move said control blocks toward the wide end of said wedging pockets, whereby, when said cam race overruns relative to said pathway in said one circumferential direction, said control blocks will tend to be moved toward the wide end of their respective wedging pockets by the frictional force induced on them by said pathway and will consequently tend to move their respective rollers toward the wide end of said wedging pockets, in opposition to said energizing springs, thereby reducing the force with which said energizing springs bias said rollers into contact with said pathway and their respective cam ramps, thereby reducing the wear of said rollers on said cam ramps during overrun, with the frictional force of said pathway on said control blocks ending as said cam race reverses its relative direction, thereby allowing said energizing springs to again act on said rollers without opposition from the control blocks.

3. An overrunning clutch of the type that is adapted to be located between a cam race having a plurality of cam ramps thereon sloping in one circumferential direction and a cylindrical pathway of a substantially coaxial pathway race, with each of said cam ramps confronting said pathway to form a series of wedging pockets, each having a wide end and a narrow end, said clutch comprising, a cage adapted to be installed to said cam race, a plurality of rollers retained by said cage, each of which is located in a respective wedging pocket, a plurality of energizing springs, each of which has a roller conforming end loop that continually biases a respective roller on one side toward the narrow end of a respective wedging pocket and into contact said pathway and its respective cam ramp so as to be ready to quickly wedge between said races to lock said races together when said cam race tends to rotate relative to said pathway race in the opposite circumferential direction, while said cam race may freely overrun relative to said pathway race in said one circumferential direction, a plurality of control blocks, each of which is located between said races on the opposite side of a respective roller from said roller's energizing spring and each of which has an end surface that faces a respective roller and each of which is circumferentially movable toward the wide end of said wedging pocket, each of said control blocks also having an arcuate surface that is engageable with said pathway, and, means engaging said control block arcuate surfaces with said pathway during overrun so as to induce a frictional force on said control blocks that tends move said control block end surfaces toward the wide end of said wedging pockets, whereby, when said cam race overruns relative to said pathway in said one circumferential direction, said control blocks will tend to be moved toward the wide end of their respective wedging pockets by the frictional force induced on said control block arcuate surfaces by said pathway, thereby confining and stabilizing said rollers between said control block end surfaces and said energizing spring roller conforming end loops, and also thereby tending to move said rollers toward the wide end of their respective wedging pockets, in opposition to said energizing springs, thereby reducing the force with which said energizing springs bias said rollers into contact with said pathway and their respective cam ramps and thereby reducing the wear of said rollers on said cam ramps during overrun, with the frictional force of said pathway on said control blocks ending as said cam race reverses its relative direction, thereby allowing the energizing springs to again act on said rollers without opposition from the control blocks.

* * * * *